Sept. 18, 1934.  I. GREENSAFT  1,974,068
ILLUMINATED WALL AQUARIUM
Filed Oct. 6, 1931  2 Sheets-Sheet 2

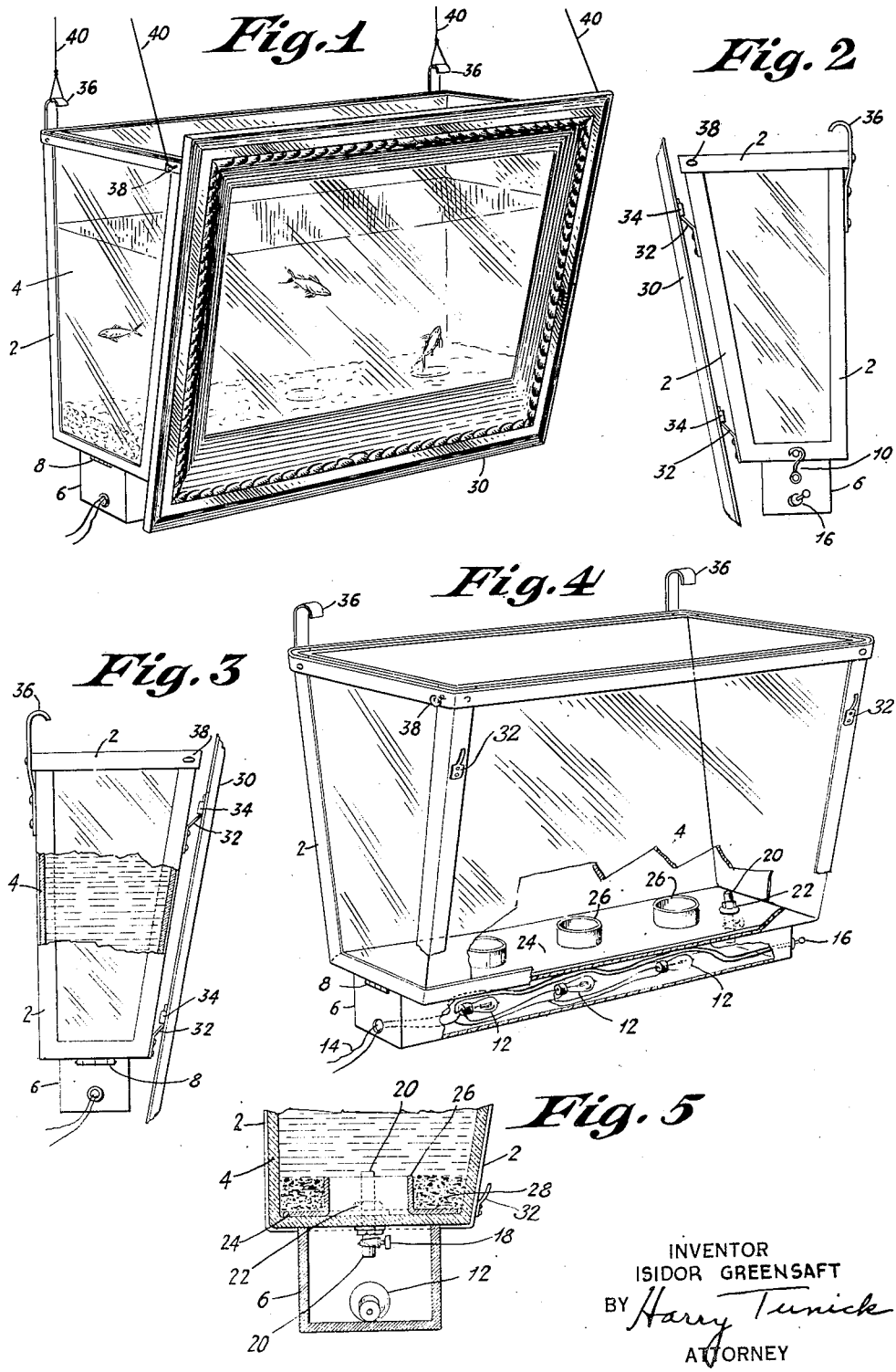

INVENTOR
ISIDOR GREENSAFT
BY Harry Tunick
ATTORNEY

Patented Sept. 18, 1934

1,974,068

UNITED STATES PATENT OFFICE 1,974,068

ILLUMINATED WALL AQUARIUM

Isidor Greensaft, Belmar, N. J.

Application October 6, 1931, Serial No. 567,200

6 Claims. (Cl. 119—5)

My present invention relates to aquariums and deals in particular with aquariums of the illuminated variety.

It is an object of my present invention to provide an aquarium which shall simulate a picture or the like. To fulfill this object I provide an aquarium adapted to be supported against a wall, and which has a decorative frame, preferably removable, adding to the picture like effect and artistic appearance of the aquarium.

A further object of my present invention is to provide for the illumination of the contents of my improved aquarium. To do so, I fix a plurality of incandescent lamps to the bottom of an open framework within which is placed an open topped transparent water container. Preferably, the lamps are placed within an opaque enclosure having an open top facing the bottom of the container.

To facilitate lamp replacement, the compartment is hinged at one of its ends to the open framework and at its other end suitably removably fixed thereto as by a catch or the like. The decorative frame mentioned above, should, of course, be sufficiently wide to hide from view or otherwise cover the compartment.

Still further objects of my present invention are to provide an aquarium which shall be inexpensive to manufacture, pleasing in appearance and readily supportable against a wall an appreciable distance from the floor.

My invention is, of course, defined with particularity in the appended claims. However, it may best be understood, both as to its structural organization and mode of operation by referring to the accompanying drawings, which it is to be clearly understood, are given merely by way of illustration:—

Figure 6:
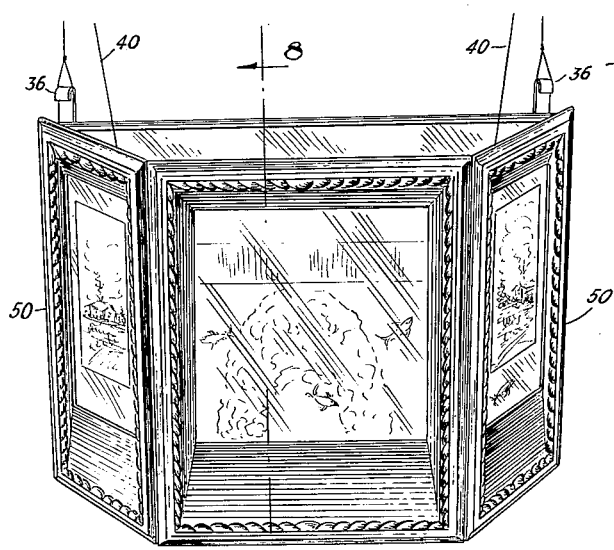
Figure 7:
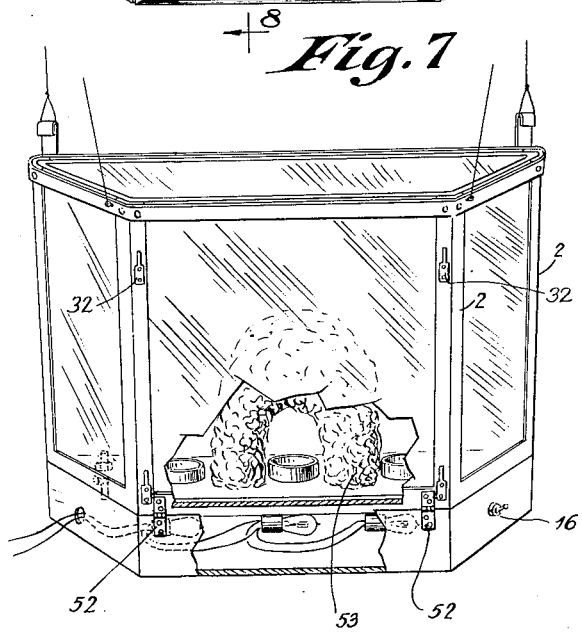
Figure 8:
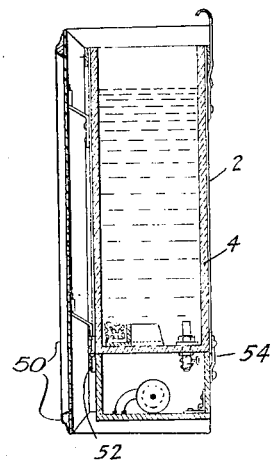

In the accompanying drawings, Figure 1 is a perspective view of a preferred embodiment of my improved illuminated aquarium, Figure 2 is an end view of the apparatus of Figure 1 illustrating the manner of supporting the decorative frame to the container supporting framework, Figure 3 is another end view of the apparatus shown in Figure 1 and illustrates the manner in which the compartment is hinged to the framework, Figure 4 is a perspective view of my improved aquarium, partly in section and with the decorative frame removed, Figure 5 is a cross section of a portion of my improved illuminated aquarium, and, Figures 6, 7 and 8 are views of a modified form of my invention, Figure 8 being a view of Figure 6 taken along the plane 8—8 as indicated.

Turning to Figures 1 to 5, indicating a preferred embodiment of my illuminated aquarium, an open metallic framework 2 supports a transparent glass, open topped water container 4, suitably shaped so as to fit snugly within the open framework 2. The framework 2 may be of metal cast in one piece, or it may be made of several suitable pieces of angle iron and/or straps suitably fastened together as by brazing, welding, soldering, or, by fixing the pieces together by riveting, bolting or the like.

Hinged by means of hinge 8 to the underside of the framework 2 there is a rectangular compartment or enclosure 6 of suitable material such as wood or sheet metal. The compartment or enclosure is removably fixed to the framework at its other end, as shown in Figure 2, by a latch 10 of usual form.

Within the compartment are mounted a plurality of incandescent lamps 12. Energy is fed to the lamp by a suitable line 14, and energization of the lamps is controlled by actuation of switch 16, fixed to compartment 6. The lamps may be replaced by unlatching latch 10 and dropping the compartment so that the lamps are accessible.

To lessen the height of the compartment and make the same less conspicuous, the lamps 12 are preferably placed in a reclining position, as illustrated.

If desired, walls or separators may be placed between the lamps, so that each lamp rests in a separate section of the compartment. Moreover, the lights may be colored to pass colored light through the water.

To still heighten the beauty of the aquarium and make it appear as a "living" picture, a decorative frame 30 may be removably fixed to the front thereof by means of suitably spaced prongs 32 suitably fixed to the front of the framework 2 and cooperating with suitably spaced loops 34 fixed to the rear side of the decorative frame 30. The width of the frame should be such that it covers the framework and compartment 6.

To support my aquarium, I provide a plurality of inwardly turned hooks 36 fixed to the rear of the framework. The hooks are turned relatively forwardly so that the aquarium may rest flush against a wall. To prevent any forward tilting, screw eyes 38 fixed to a relatively forward portion of the framework, are provided. Supporting wires 40 or the like may be then fastened to the hooks and eyes and to wall supports or hooks (not shown).

In the dropped position of compartment 6, the container 4 may be drained by actuating valve or stop-cock 18 so that the tank or container 4 empties through vent or drain pipe 20. The latter is placed through a hole in the tank 4 and non-leakably fixed thereto by a suitable nut and washer arrangement 22. This nut and washer arrangement should, of course, be duplicated on the underside of the tank, as shown in Figures 5 and 8.

If desired, a false bottom 24 is provided, having cylindrical projections 26. These projections may be surrounded with sand, stone, gravel and the like 28, as shown in Figure 5. In that event, care should be taken that the vent pipe 20, projects over the surrounding sand. Also, the incandescent lamps 26 are placed directly beneath the orifices in the false bottom so that the light is projected in concentrated beams through the water enhancing the beautifying effect of the illumination.

Turning now to Figures 6, 7 and 8 illustrating a modified form of my invention, it will be noted that in general the construction of this modified arrangement is similar to the preferred form shown in Figures 1 to 5 inclusive. However, to increase, if possible, the artistic effect and appearance of my illuminated aquarium, it is shaped so as to have front and rear sides or faces which are parallel, and sides which are not parallel to each other but arranged symmetrical with respect to the front and rear faces. The polyhedronal shape to be given to the open framework is indicated in Figure 7.

The side frames 50 may be removably fixed to the open framework 2 by a suitable arrangement of prongs and metallic supporting loops as described in connection with Figures 1 to 5. If desired, translucent pictures may be painted on the side panes of the tank, and/or on the front or rear panes of the tank. The tank itself, of course, is shaped so as to correspond to the shaping of the open framework.

In the modified arrangement, the compartment is hinged by means of front hinges 52 to the framework so that the compartment drops away from the wall against which the aquarium rests. The compartment is held in its closed position against the tank and open framework by means of latches 54 fixed to the rear of the compartment and open framework. As an added touch of beauty an imitation stone arch 53 may be placed so as to rest on the false bottom of the tank which in this case is also suitably shaped so as to conform to the contours of the framework.

Many minor changes will, of course, readily suggest themselves to those skilled in the art. Accordingly, my present invention is not to be limited by the described embodiments, but is to be given the full scope and breadth indicated by the appended claims.

Having thus described my invention, what I claim is:

1. A wall aquarium comprising in combination, an open supporting framework, an open-topped water retaining container of transparent material, within and supported by said framework, an open-topped enclosure of opaque material arranged underneath said framework and container, the open top of said enclosure facing the bottom of said container, a decorative frame fixed to the front of said framework covering said framework and compartment, a plurality of incandescent lamps fixed to and within said enclosure for illuminating the contents of said container, said enclosure being hingedly mounted on said framework, and means for maintaining said hinged enclosure in fixed relationship against said framework.

2. An illuminated wall aquarium comprising in combination, an open supporting framework, an open-topped container within and supported by said framework, an enclosure hinged at one end to the bottom of said framework and removably fixed at its other end to the bottom of said framework, a plurality of incandescent lamps within said enclosure, and a switch fixed to said enclosure for controlling the energization of said lamps.

3. An illuminated wall aquarium comprising in combination, an open supporting framework, an open-topped container within and supported by said framework, an enclosure hinged at one end to the bottom of said framework and removably fixed at its other end to the bottom of said framework, a plurality of incandescent lamps within said enclosure, for illuminating the contents of said container, and a decorative frame attached to the front of said framework for covering said framework and enclosure.

4. An illuminated aquarium comprising an open framework, a glass open topped water container within and supported by said framework, an open-topped rectangular enclosure hinged to the underside of said framework, means for maintaining said hinged enclosure against said framework, a plurality of spaced prongs fixed to the front of said framework, a decorative frame, a plurality of metallic loops fixed to the rear of said frame and spaced so as to fit over said prongs whereby said decorative frame is removably supported upon said framework by said prongs, a false bottom for said container, said false bottom having integral therewith a plurality of vertically arranged cylindrical elements, said bottom having openings therein coaxial with said cylinders, a plurality of incandescent lamps supported within said compartment and arranged beneath the openings of said false bottom, and a switch fixed to said compartment for controlling the energization of said lamps.

5. An illuminated wall aquarium comprising, in combination, an open supporting frame work, an open topped container within and supported by said frame work, an enclosure hinged at one end to the bottom of said frame work and removably fixed at its other end to the bottom of said frame work, a plurality of incandescent lamps within said enclosure, a switch fixed to said enclosure for controlling the energization of said lamps, a drain pipe fixed to said container and protruding into said enclosure, and a valve within said enclosure and connected to said pipe, said valve being accessible only upon movement of said enclosure away from the bottom of said frame work.

6. An illuminated wall aquarium comprising, in combination, an open supporting frame work, an open topped container within and supported by said frame work, a drain valve connected to the bottom of said container, an enclosure hinged at one end to the bottom of said frame work and removably fixed at its other end to the bottom of said frame work, said enclosure covering said valve, a plurality of incandescent lamps within said enclosure for illuminating the contents of said container, and a decorative frame attached to the front of said frame work for covering said frame work and enclosure.

ISIDOR GREENSAFT.